United States Patent

Suzuki et al.

Patent Number: 6,033,752
Date of Patent: Mar. 7, 2000

[54] OPTICAL RECORDING MEDIUM AND METHOD FOR RECORDING OPTICAL INFORMATION

[75] Inventors: Koichiro Suzuki; Tomohiro Onda; Isao Kobayashi; Koji Uchida; Hiroyuki Shiomi, all of Tochigi-ken, Japan

[73] Assignee: Kao Corporation, Tokyo, Japan

[21] Appl. No.: 09/081,933

[22] Filed: May 21, 1998

[30] Foreign Application Priority Data

May 22, 1997 [JP] Japan ..................................... 9-132369
Aug. 1, 1997 [JP] Japan ..................................... 9-207895
Dec. 2, 1997 [JP] Japan ..................................... 9-332052

[51] Int. Cl.$^7$ ...................................................... B32B 3/00
[52] U.S. Cl. ........................ 428/64.1; 428/64.4; 428/64.5; 428/913; 430/270.13; 430/495.1; 430/945; 369/283; 369/288
[58] Field of Search ................................. 428/64.1, 64.2, 428/64.4, 64.5, 913; 430/270.13, 495.1, 945; 369/283, 288

[56] References Cited

U.S. PATENT DOCUMENTS 5,580,632 12/1996 Ohkawa et al. ........................ 428/64.1
5,652,037 7/1997 Ohkawa et al. ........................ 428/64.1
5,817,389 10/1998 Ono ........................................ 428/64.1

FOREIGN PATENT DOCUMENTS

56-8293 1/1981 Japan .
57-22095 2/1982 Japan .
4-89374 8/1992 Japan .
6-131693 5/1994 Japan .

*Primary Examiner*—Elizabeth Evans
*Attorney, Agent, or Firm*—Oblon, Spivak, McClelland, Maier & Neustadt, P.C.

[57] ABSTRACT

The present invention provides an optical recording medium which incorporates an inorganic based recording layer which has a high reflectance, sufficient for reproduction compatibility on devices such as CD-ROM drives, as well as a high degree of modulation between the state prior to recording and that after recording, as well as an information recording method therefor. Accordingly, an optical recording medium comprises a substrate (2) which is substantially transparent with respect to a recording light beam and a reproduction light beam, a first recording layer (3) which is layered on top of the substrate (2) and which incorporates as the main constituent a metal which has a low melting point and a high reflectance, and a second recording layer (4) which is layered on top of the first recording layer (3) and which will, due to heat generated from irradiation of a light beam through the substrate (2), either mix, or alternatively react, with the first recording layer (3) to form an alloy of low reflectance as well as forming irregularities or pitting in the surface, thereby enabling the recording of information. Due to the heat generated from irradiation of a recording light beam through the substrate (2) the first recording layer (3) and the second recording layer (4) are either mixed, or alternatively reacted to form an alloy as well as forming irregularities or pitting in the surface, thereby recording information.

5 Claims, 3 Drawing Sheets

OPTICAL RECORDING MEDIUM AND METHOD FOR RECORDING OPTICAL INFORMATION

FIELD OF THE INVENTION

The present invention relates to an optical recording medium and a method for recording optical information, and in particular to a write once type optical recording medium comprising a recording layer of an inorganic material, on which information can only be recorded once, and a method for recording optical information.

RELATED ART OF THE INVENTION

The materials used for the recording layer of currently available write once type optical disks, that is, optical recording media on which information can only be recorded once, can be broadly divided into two groups; organic color based materials and inorganic materials. Of these, write once type optical disks such as CD-R which employ organic color based materials in the recording layer (hereafter these disks are referred to as organic color based optical disks) have a reflectance of greater than 65%, and as a result can be reproduced on currently available CD-ROM drives and CD players which are dedicated to reproduction.

On the other hand, recently proposed write once type optical disks which employ inorganic materials in the recording layer (hereafter these disks are referred to as inorganic based optical disks) have relatively low reflectances, and reproduction on devices such as the aforementioned CD-ROM drives can be difficult. As a result of this difference in reproduction compatibility, currently, optical disks which employ organic color based material in the recording layer account for the great majority of the write once type optical disk market.

However, there are a number of shortcomings with organic color based optical disks.

Firstly, exposure of organic color based optical disks over long periods to even relatively weak light sources which exist in typical daily environments such as sunlight or electric lights, can cause photodecomposition of the organic color used in the recording layer, leading to a loss in the original characteristics of the layer. Consequently, for example, if an organic color based optical disk on which a signal is recorded is left sitting in the sunlight the signal recorded on the disk will deteriorate, and may lead to a loss of the signal.

In addition, because the optical properties (such as the refractive index and the absorption coefficient) of the organic color varies greatly depending on the wavelength of the light, there is no compatibility with respect to wavelength. That is, an organic color based optical disk designed with a reflectance and absorption value relative to the wavelength of a specific light source, will have greatly different reflectance and absorption values relative to another light source with a different wavelength, and so recording on, and or reproduction of the disk using a drive in which the wavelength of the light source is different from the original design may be impossible.

Furthermore, organic colors are typically low in rigidity, thus lowering the overall physical strength of the optical disk.

This situation has meant that there is considerable research being conducted into the development of inorganic based optical disks which do not have the aforementioned shortcomings present in organic color based optical disks but which also have a high reflectance thus allowing reproduction compatibility on devices such as CD-ROM drives.

The various types of recording layers employed in currently available inorganic based optical disks are discussed in chapter 4 of "Easy Understanding of Optical Disk", published by Optronix Ltd., and include (1) recording layers employing pitting, (2) recording layers utilizing gas bubble formation within the layer, (3) recording layers utilizing reaction within the layer, (4) recording layers utilizing phase change, and (5) recording layers utilizing reversals in magnetization.

Of these various types, recording layers using the pitting technique (1) make wide use of Te based materials, where a large change in reflectance (degree of modulation) is observed between the situation before recording and that after recording, but these types of layers suffer from not having a very high reflectance prior to recording.

A further problem arises in that pits are easily formed in the surface, and so the recording layer needs to be protected with a complex construction known as an air sandwich.

Furthermore, a method has been proposed whereby a protective layer of UV cured resin is used to cover the pitted recording layer, but in this case the recording sensitivity decreases markedly, and in order to compensate for this the thickness of the recording layer needs to be reduced, resulting in a reflectance prior to recording of only approximately 10%.

For recording layers utilizing gas bubble formation within the layer (2) a problem arises that if the recording power is too high the bubbles can burst.

Examples of recording layers which utilize reaction within the layer (3) include double layered films of Bi and Se, and various configurations have been proposed, including those presented in Japanese Unexamined Patent Publication No. 56-8293, Japanese Unexamined Patent Publication No. 57-22095, Japanese Unexamined Utility Model Publication No. 4-89374, and Japanese Unexamined Patent Publication No. 6-131693, but the problem with these configurations is that they do not have a high enough reflectance prior to recording to allow reproduction compatibility on devices such as CD-ROM drives.

Furthermore, practical examples of recording layers utilizing phase change (4) include materials such as Ge-Sb-Te and Ag-In-Sb-Te, but none of the materials were able to provide the combination of a high reflectance prior to recording and a high degree of modulation.

Moreover, almost all the recording layers utilizing reversals in magnetization (5) utilize a magneto-optical effect during reproduction of the information, and thus require special optical systems.

SUMMARY OF THE INVENTION

The present invention takes into consideration the above problems with an object of providing an optical recording medium which can be produced inexpensively and easily and which incorporates an inorganic based recording layer which has a high reflectance, sufficient for reproduction compatibility on devices such as CD-ROM and DVD-ROM drives, as well as a high degree of modulation between the state prior to recording and that after recording, as well as providing a favorable method for recording optical information onto such an optical recording medium.

The optical recording medium of the present invention comprises a substrate which is substantially transparent with respect to a recording light beam and a reproduction light beam, a first recording layer which is layered on top of the substrate and which incorporates as the main constituent a metal which has a low melting point and a high reflectance, and a second recording layer which is layered on top of the first recording layer and which will, due to heat generated from irradiation of a light beam through the substrate, either mix, or alternatively react, with the first recording layer to form an alloy of low reflectance as well as forming irregularities or pitting in the surface, thereby enabling the recording of information signals.

With such a construction, prior to the recording of information a high reflectance is observed due to the metal having a high reflectance of the first recording layer, while after the recording of information via light beam irradiation, an alloy with a low reflectance is formed from the mixing or reaction of the first and second recording layers, and pitting or irregularities are also formed in the surface thus greatly lowering the reflectance. The combination of the mixing or reaction of the two recording layers, and the formation of pitting or irregularities in the surface, means that in comparison with pitted optical recording media comprising only a single metal recording layer either increased recording sensitivity can be achieved (allowing a reduction in the power of the light beam used for recording), or the degree of modulation (the difference between the reflectance prior to recording and that after recording) can be improved, and moreover the degree of modulation will also be greater than for optical recording media where there is no accompanying formation of irregularities or pitting in the surface.

A preferred configuration of the optical recording medium of the present invention comprises a substrate which is substantially transparent with respect to a recording light beam and a reproduction light beam, a metallic first recording layer which is layered on top of the substrate and which incorporates In as the main constituent, and a metallic or non-metallic second recording layer which is layered on top of the first recording layer and which incorporates at least one element from group 5B or group 6B of the periodic table and which will, due to heat generated from irradiation of a light beam through the aforementioned substrate, form an alloy with the first recording layer thereby enabling the recording of information signals.

In, or alloys incorporating In as a main constituent display high reflectances and also have melting points which are low enough to enable melting to be achieved through irradiation with semiconductor lasers, and are consequently very suitable for the first recording layer. Furthermore, metals or non-metals which incorporate at least one element from group 5B or group 6B of the periodic table form compound alloys with In which display low reflectances and are consequently very suitable for the second recording layer.

In such a construction, even if the extent of irregularity formed during recording is small, good signal characteristics can be obtained.

Furthermore, by generating a protective layer on top of the second recording layer, optical recording media with good durability can be produced.

Furthermore, by incorporating at least one of Ge and Si into the metallic first recording layer which incorporates In as the main constituent, the recording sensitivity and the signal quality of the optical recording medium can be improved.

Furthermore, by using a construction in which the second recording layer is formed from a material incorporating Te as a main constituent, an optical recording medium with excellent recording sensitivity and signal quality can be produced.

In a method for recording optical information onto an optical recording medium which comprises; a substrate which is substantially transparent with respect to a recording light beam and a reproduction light beam, a first recording layer which is layered on top of the substrate and which incorporates as the main constituent a metal which has a low melting point and a high reflectance, and a second recording layer which is layered on top of the first recording layer, an optical information recording method can be used wherein the first and second recording layers are either mixed, or alternatively reacted due to heat generated from irradiation of a recording light beam through the aforementioned substrate to form an alloy of low reflectance as well as forming irregularities or pitting in the surface, thereby recording information.

DESCRIPTION OF THE PREFERRED EMBODIMENT

As follows is a description of preferred embodiments of an optical recording medium according to the present invention, with reference to the drawings.

Figure 1:
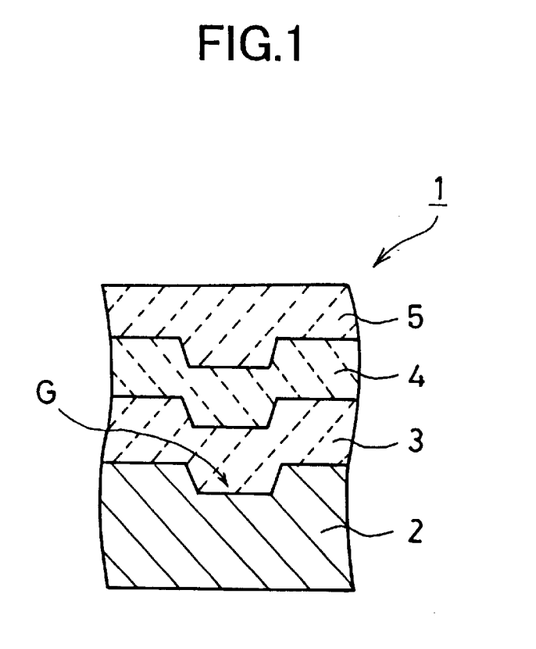
FIG. 1 is a cross-sectional diagram showing a sample construction of an optical recording medium of the present invention.

FIG. 1 is a cross-sectional diagram showing a sample construction of an optical recording medium of the present invention.

The optical recording medium 1 is constructed of a substrate 2 onto which is layered sequentially a first recording layer 3, a second recording layer 4, and a protective layer 5.

The substrate 2 is preferably constructed of a material such as resin or glass which is transparent to the light beam to be used, with resin being particularly desirable as it is inexpensive and easy to handle. Specific examples of suitable resins include polycarbonate resins, acrylic resins, epoxy resins and ABS resins. There are no particular restrictions on the shape or dimensions of the substrate, but normally it is disk shaped, of between 0.5 and 3mm thickness and with a diameter of between 40 and 360 mm. The real part n of the refractive index of the substrate 2 constructed of the materials described above is typically between 1.3 and 2.5.

Figure 2:
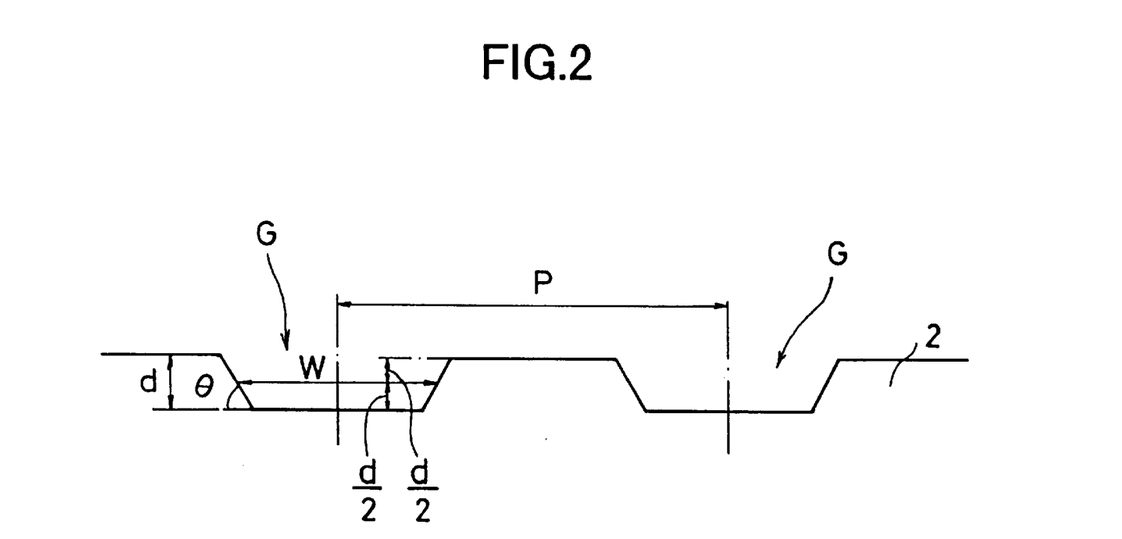
FIG. 2 is an explanatory diagram showing the shape of a guide track on the surface of a substrate.

A guide track G of a special shape is formed on the surface of the substrate 2 for tracking and address purposes. The depth d(nm) of the guide track G shown in FIG. 2 should preferably, though not necessarily always, satisfy the requirement $$0.03\ \lambda/n < d < 0.11\ \lambda/n$$

where $\lambda$ (nm) represents the wavelength in a vacuum of the irradiating light beam and n the real part of the refractive index of the substrate 2, and values which satisfy the requirement $0.05 \lambda/n < d < 0.08 \lambda/n$ are even more desirable.

If the depth d of the guide track G is equal to or greater than the upper limit of 0.11 λ/n mentioned above, then rays of light reflected from the guide track G, and from the area between the tracks (hereafter referred to as the land) respectively, will be of opposite phase, and thus interference will result in a lowering of the reflectance. Moreover, the coding of the push-pull signal used for tracking purposes can also occasionally be reversed. In contrast, if the depth d of the guide track G is equal to or less than the lower limit of 0.03 /n mentioned above, then the difference in phase between light reflected from the guide track G and that reflected from the land will be small and result in very little interference effect, making it difficult to obtain both the push-pull signal used for tracking servo purposes, and the radial contrast signal. For example, in the instance where a semiconductor laser of wavelength λ=780 (nm) is used as the light source and a polycarbonate resin with n=1.55 as the substrate, the depth d of the guide track G should preferably be 15 nm<d<55 nm, with values 25 nm<d <40 nm being even more desirable. Furthermore, if a red colored semiconductor laser of wavelength λ=650 (nm) is used as the light source with a similar polycarbonate resin with n=1.55 as the substrate, the depth d of the guide track G should preferably be 13 nm<d<46 nm, with values 21 nm<d<34 nm being even more desirable. Furthermore, if a blue colored semiconductor laser of wavelength λ=420 (nm) is used as the light source with a similar polycarbonate resin with n=1.55 as the substrate, the depth d of the guide track G should preferably be 8 nm<d<30 nm, with values 13.5 nm<d<22 nm being even more desirable.

The width w(nm) of the guide track G shown in FIG. 2 should preferably satisfy the requirement $0.1\ P < w < 0.5\ P$ where P(nm) represents the spacing between two adjacent guide tracks (that is, the track pitch), and values which satisfy the requirement $0.2\ P < w < 0.4\ P$ are even more desirable.

If the width w of the guide track G is equal to or less than the lower limit of 0.1 P mentioned above then the amplitude of the push-pull signal used for tracking servo purposes decreases leading to the possibility of tracking errors. On the other hand, the upper limit of the track width w is set based on the current CD-R standards (known as the "Orange Book Part II") which requires that the reflectance from the guide track G is lower than the reflectance from the land, that is, that the radial contrast must be positive. However, in principle it should be possible to use a negatively coded radial contrast signal, and in such instances the track width w should preferably satisfy the requirement 0.5 P<w<0.9 P.

For example, in the case of current compact disks where the track pitch is 1600 nm, the width w of the guide track G should preferably satisfy the requirement 160 nm<w<800 nm, with values satisfying 320 nm<w<640 nm being particularly desirable. As shown in FIG. 2 the side surfaces of the guide track G are usually sloped (slope angle θ) and are constructed so that they open out towards the first recording layer 3. In the working examples of the present invention the width w of the guide track G is defined as being the width at half the depth (d/2) of the guide track G. as shown in FIG. 2.

Moreover, the guide track G can be caused to snake periodically if required (this snaking is known as "wobble"), for the controlling of the disk spin rate or address information.

The first recording layer 3 is constructed of a metal which has a low melting point and a high reflectance. The melting point of this metal should preferably be equal to or lower than 450° C., with values equal to or below 200° C. being even more desirable. Furthermore, the reflectance of the metal in bulk form should be equal to or greater than 40%, with values equal to or greater than 70% being even more desirable. Examples of suitable materials include metals such as In, Sn, Pb and Zn, each of which is applicable in itself, metal-metal alloys such as Sn-Pb alloy or In-Sn alloy which comprise two or more of the aforementioned applicable metals, or alloys such as Sn-Ag alloy, In-Si alloy or Sn-Pb-Si alloy comprising either one or a plurality of the aforementioned applicable metals with another element, where the atom % of the suitable metal or metals is at least 50%.

From the consideration that the first recording layer 3 should have a high reflectance, a metal layer with In as a main constituent is particularly suitable. In order to achieve an even higher reflectance, either pure In, or an alloy with a high concentration of In is preferable, while on the other hand in order to improve the recording sensitivity an alloy with a reduced In concentration is preferable. Examples of suitable metals which can be combined with In to create alloys include Au, Ag, Al, Be, Cu, Fe, Ge, Pb, Si, Sn, Ta, V and Zn. Of these metals, Ge and Si are particularly suitable due to the jitter improvement thus realized. Moreover, in order to improve the recording sensitivity even further, metal sulfides such as CrS, $Cr_2S$, $Cr_2S_3$, $MoS_2$, MnS, FeS, $FeS_2$, CoS, $Co_2S_3$, NiS, $Ni_2S$, PdS, $Cu_2S$, $Ag_2S$, ZnS, $In_2S_3$, $In_2S_2$, GeS, $GeS_2$, SnS, $SnS_2$, PbS, $As_2S_3$, $Sb_2S_3$ and $Bi_2S_3$, metal fluorides such as $MgF_2$, $CaF_2$ and $RhF_3$, metal oxides such as MoO, InO, $In_2O$, $In_2O_3$, GeO, PbO, SiO and $SiO_2$, carbides such as SiC, TaC and TiC, or elemental carbon C can be added to the In or In alloy, either separately or in mixtures of two or more compounds thereof. Particularly suitable compounds are GeS, MnS, ZnS and $SiO_2$.

In those instances where the first recording layer 3 is formed from an alloy comprising at least one metallic element other than In, it is preferable if the ratio A (A=ρM/(In+ΣM)) of the total amount M of the metallic element incorporated in the alloy satisfies the requirement 0<A≦30 atom %. If another metallic element is incorporated into the alloy at a ratio of greater than 30 atom %, then the reflectance can fall and the melting point rise. Furthermore, in those instances where additional compounds are added to the In or In alloy, it is preferable if the ratio B (B=ΣC/(In+ΣM+ΣC)) of the total amount of compounds incorporated into the alloy satisfies the requirement 0<B≦20 mol %. Additions of even small amounts of the aforementioned compounds are beneficial, whereas the addition of compounds in excess of 20 mol % can lead to a reduction in the reflectance.

Following formation of the first recording layer 3 and prior to the formation of the second recording layer 4, the surface of the first recording layer 3 is exposed to the atmosphere and a thin oxidized layer is created on the surface of the first recording layer 3 at this time.

The second recording layer 4 is constructed of a material which will, upon mixing or reaction with the first recording layer 3, form an alloy with a low reflectance. In those instances where the first recording layer 3 is a metal incorporating In as a main constituent, it is preferable if the second recording layer 4 is constructed of a material which incorporates at least one element from either group 5B or group 6B of the periodic table. The second layer 4 can be constructed entirely of one of the aforementioned elements from these two groups, or alternatively, can be constructed from an alloy or compound incorporating a plurality of the aforementioned elements, or from an alloy incorporating one or more of the aforementioned elements and an additional different element. In those instances where the second recording layer 4 is constructed entirely of one of the aforementioned elements, As, Se, Sb, Te and Bi are preferable as they can be easily formed into thin films using sputtering techniques and are relatively inexpensive, although Po can also be used. Examples of different elements and compounds which can be incorporated into a second recording layer 4 constructed from an alloy comprising one or more of the aforementioned elements include Ag, B, C, Cu, Ge, In, Si and ZnS. Furthermore, alloys such as In-Sb-Te, Ag-In-Sb-Te, Au-In-Sb-Te, Ge-Sb-Te, Pd-Ge-Sb-Te and Te-O-Pd which are in current use in the recording phase of phase change optical recording media can also be employed as the aforementioned alloy. Moreover, elements of group 5B or 6B such as N, O, P and S for which formation of a thin film of the element is difficult, can be incorporated into the second recording layer 4 in the form of nitrides, oxides, phosphides or sulfides respectively.

Consideration of factors such as recording sensitivity, signal characteristics and safety of the materials involved suggests that second recording layers 4 constructed of Te, or of alloys comprising Te as a main constituent are preferable. Examples of elements or compounds which can be combined with Te to form alloys include Ag, B, C, Cu, Ge, In, Sb, Si and ZnS, with additions of one or more of these materials being possible. From the viewpoint of improving recording sensitivity and signal quality Ag and Ge are particularly preferable. Additions of even small quantities of these elements or compounds is beneficial, and the total amount of additives should preferably be kept within the range 0.1~50 mol %.

In an optical recording medium 1 comprising a first recording layer 3 and a second recording layer 4 as described above, the first recording layer 3 and the second recording layer 4 will form an alloy (a solid solution, eutectic mixture or a compound) at those portions of the media which are exposed to a recording light beam of predetermined power which is irradiated through the substrate 2.

There are two possible ways in which the first recording layer 3 and the second recording layer 4 mix at the time of irradiation by the recording light beam. In the first, the second recording layer 4 melts in the same manner as the first recording layer 3, due to the heat generated by the irradiated light beam, and the two molten liquids then mix together. In the second, the second recording layer 4 does not melt due to the heat generated by the irradiated light beam, but rather fuses with and diffuses into the molten liquid of the first recording layer.

Specifically, the first recording layer 3 of In or an In alloy has a low melting point and is easily melted by irradiation with the light beam of a semiconductor laser, and so alloy formation can be achieved by light irradiation. Furthermore, because the first recording layer 3 constructed from a metal incorporating highly reflective In as a main constituent is located on top of the substrate 2 through which the recording and/or reproduction light is irradiated, a high reflectance is achieved in the state prior to recording.

The elements from group 5B or 6B of the periodic table which are incorporated into the second recording layer 4 mix or react with the In to form an intermetallic compound or a semiconductor thus reducing the metallic properties of the In. Consequently, those portions of the medium which have been irradiated with the recording beam and for which the In of the first recording layer 3 has mixed with the second layer 4 appear as a record marked portion with a very different refractive index to that of metallic In.

In the present invention the above mixing and/or reaction is accompanied by an induced deformation at the interface between the substrate 2 and the first recording layer 3, and/or at the interface between the second recording layer 4 and the protective layer 5, meaning an irregularity or pit is also formed at the record marked portion. The combination of the formation of an alloy with a different refractive index, and the formation of irregularities or pitting, means the reflectance at the record marked portion is greatly reduced causing a "high to low" record with a large degree of modulation. Because the formation of the irregularities or pitting utilizes the mixing and/or reaction of the two recording layers, it is possible to achieve improved recording sensitivity or an increased degree of modulation in comparison with current pitted optical recording media which comprise only a single recording layer.

Experimental confirmation of the formation of irregularities or pitting at the record marked portion can be achieved by mechanically removing the protective layer 5 from the optical recording medium 1, and then measuring the surface contours of the second recording layer 4 using an atomic force microscope (AFM). Alternatively, the protective layer 5, the second recording layer 4 and the first recording layer 3 can be mechanically removed from the optical recording medium 1 and the surface contours of the substrate 2 measured by an AFM.

In order to obtain a high reflectance prior to recording and a large degree of modulation following recording, the thickness of the first recording layer 3 should preferably be within the range 5~50 nm, with values between 10~30 nm being even more desirable. The thicker the first recording layer 3 is the higher the reflectance prior to recording will be, but at thicknesses exceeding 50 nm the reflectance becomes almost saturated, and as the thickness of the layer increases the heating effect of the light beam becomes insufficient, resulting in a reduction in the recording sensitivity and signal quality.

If the thickness of the first recording layer 3 is less than 5 nm, then there is an unfavorable reduction in both the reflectance prior to recording, and in the change in the reflectance between the state prior to recording and that following recording.

The thickness of the second recording layer 4 should usually be in the range 5~200 nm, with values in the range 5~50 nm being even more desirable. If the thickness of the second recording layer 4 is less than 5 nm then the reflectance does not fall much following recording, resulting in an unsatisfactory degree of modulation. Furthermore, if the thickness exceeds 200 nm the heating effect of the light beam becomes insufficient creating the possibility of a reduction in the recording sensitivity.

The protective layer 5 can comprise a single or plurality of layers to prevent scratching and corrosion, create a good appearance, and eliminate undesirable reflected light. This protective layer 5 should preferably be constructed with organic material as the main constituent, preferably with radiation curing compounds or compositions which have been cured by irradiation with UV light or an electron beam. It is preferable to have one layer of the protective layer 5 constructed of a colored material for the purposes of eliminating undesirable reflected light, and it is preferable if the material strongly absorbs light of the wavelength that a light source of that color emits. Generally, ink layers of dark colors such as black, dark blue or dark green are used.

Provision of this type of light absorbing protective layer helps maintain the uniformity of the signal quality across the surface of the optical recording medium. The thickness of the protective layer is typically of the magnitude 0.1~100 μm, and can be formed using common methods such as spin coating, gravure application, spray coating or screen printing.

Figure 3:
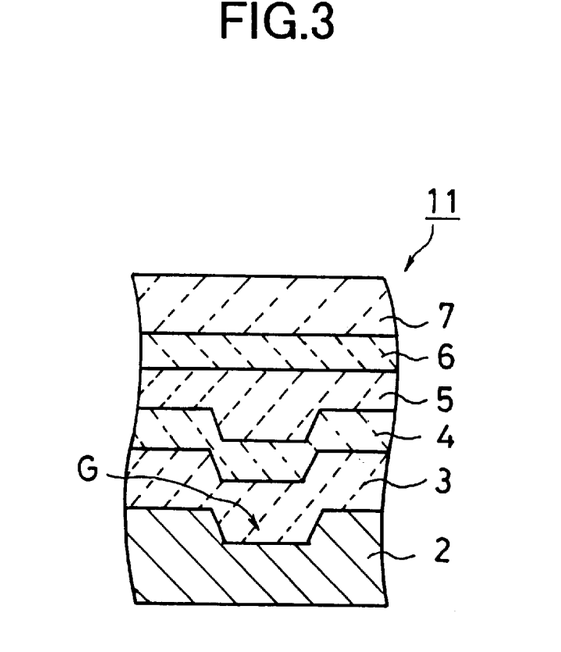
FIG. 3 is a cross-sectional diagram showing another sample construction of an optical recording medium of the present invention.

FIG. 3 shows a cross-sectional diagram of an optical recording medium 11 in which a first recording layer 3, a second recording layer 4 and a protective layer 5 are layered on top of a substrate 2 in the manner described above, and to which an upper plate 7 is then attached via an adhesive layer 6.

The adhesive layer 6 should preferably be comprised of an organic material, and construction from thermoplastic materials, adhesive materials, or radiation curing compounds or compositions which have been cured by irradiation with radiation or an electron beam is desirable. The thickness of the adhesive layer 6 is of the magnitude 0.1~100 μm, and the layer can be formed by whatever method is most appropriate for the material being used, with suitable formation methods including spin coating, gravure application, spray coating or roll coating.

The upper plate 7 can be constructed of the same resin or glass used for the substrate 2.

With such a construction, the upper surface of the optical recording medium 11 is securely protected by the upper plate 7, and there is also an improvement in the overall physical strength and durability of the entire optical recording medium.

Figure 4:
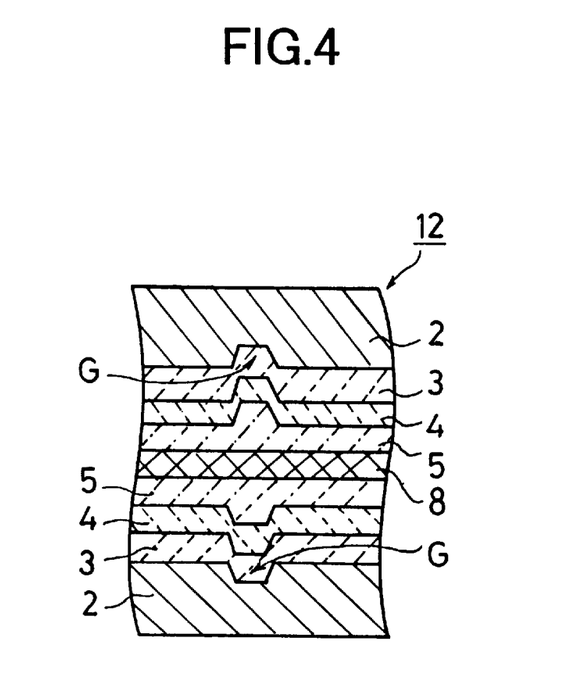
FIG. 4 is a cross-sectional diagram showing yet another sample construction of an optical recording medium of the present invention.

FIG. 4 is a cross-sectional view showing the construction of a double sided optical recording medium 12 comprising 2 halves, where each half is comprised of a substrate 2, a first recording layer 3, a second recording layer 4 and a protective layer 5, and where the two halves are then fixed together with the two protective layers 5 facing one another (ie, the side of the second recording layers 4) using an adhesive layer 8. The construction of the adhesive layer 8 is as described for the adhesive layer 6 in FIG. 3.

With such a construction, good physical strength is achieved, and double the volume of information can be recorded on a single optical recording medium.

In both FIGS. 3 and 4 the protective layer 5 can be excluded.

In the present invention, a substantially transparent bedding layer may also be provided between the substrate 2 and the first recording layer 3 for purposes such as regulation of the reflectance, regulation of heat conduction, or prevention of corrosion of the recording layer. Moreover, a thin intermediate layer can also be provided between the first recording layer 3 and the second recording layer 4 for regulating the speed at which the alloy incorporating the first recording layer 3 and the second recording layer 4 forms. Furthermore, a dielectric layer and/or a light reflection layer may also be provided between the second recording layer 4 and the protective layer 5 for purposes such as regulation of the reflectance, regulation of heat conduction, and prevention of corrosion of the recording layer.

Suitable materials for the aforementioned bedding layer provided between the substrate 2 and the first recording layer 3 include dielectric substances which are substantially transparent to the light beam being used. Specifically, nitrides such as AlN, $Si_3N_4$, GeN, TiN and ZrN, oxides such as ZnO, SiO, $SiO_2$, $TeO_x$ (x=1~2), $TiO_2$, $In_2O$, $In_2O_3$ and $Al_2O_3$, sulfides such as ZnS and $In_2S_3$, and fluorides such as $MgF_2$. These dielectric substances can be used alone, or in mixtures of two or more thereof. The insertion of the aforementioned bedding layer prevents the diffusion of water molecules incorporated in the substrate 2 into the first recording layer 3, thus preventing corrosion and oxidation of the recording layer and improving the durability of the optical recording medium. Furthermore, in those instances where the first recording layer 3 is constructed of In or an In alloy, using material containing AlN or $TeO_x$ (x=1~2) as the main constituent in the construction of the bedding layer leads to an improvement in the recording sensitivity, and this effect is particularly pronounced when material containing $TeO_x$ (x=1~2) as the main constituent is used. There are no particular restrictions on the thickness of the bedding layer, although values in the range 5~300 nm are preferable. With layers less than 5 nm thick there is a reduction in the ability of the layer to suppress the diffusion of molecules from the substrate 2 through to the first recording layer 3. Furthermore, increasing the thickness beyond 300 nm does not lead to any marked increase in the molecule diffusion suppression effect. The bedding layer is formed by vapor phase growth methods such as sputtering, vacuum deposition, plasma CVD, photo CVD and electron beam deposition.

The insertion of an intermediate layer between the first recording layer 3 and the second recording layer 4 enables the speed at which the first recording layer 3 and the second recording layer 4 mix and/or react to be regulated. In particular it suppresses the diffusion and mixing of the first recording layer 3 and the second recording layer 4 during storage at room temperature, thus improving the durability of the recording medium. There are no particular restrictions on the material used in the intermediate layer, and a wide range of materials can be used. Examples of suitable inorganic materials include nitrides such as AlN, $Si_3N_4$, GeN, TiN, ZrN, InN and BN, oxides such as ZnO, SiO, $SiO_2$, $TeO_x$ (x=1~2), $TiO_2$, $In_2O$, $In_2O_3$, $Al_2O_3$, MnO, GeO and PbO, sulfides such as ZnS, $In_2S_3$ and NiS, fluorides such as $MgF_2$ and $CaF_2$, carbides such as SiC, TaC, TiC, and elemental Carbon C. These inorganic substances can be used alone or in mixtures of two or more substances thereof. In addition, organic materials including coupling agents based on silane, titanium and aluminium, surface active agents, fatty acids, alcohol, and organic colors can also be used in constructing the intermediate layer. The thickness of the intermediate layer should preferably be equal to or less than 20 nm, with thicknesses equal to or less than 10 nm being even more desirable. At thicknesses exceeding these values a lowering in the recording sensitivity and deterioration in the signal quality can result. Inorganic intermediate layers can be formed by vapor phase growth methods such as sputtering, vacuum deposition, plasma CVD, photo CVD and electron beam deposition. Organic intermediate layers can be formed by dipping using an appropriate solvent, or spin coating.

The provision of a single dielectric layer and/or a light reflection layer, or a plurality of such layers, between the second recording layer 4 and the protective layer 5, enables regulation of the reflectance, regulation of heat conduction, and prevention of corrosion of the recording layer. However, depending on the thickness of the dielectric layer and/or light reflection layer inserted, a tendency towards suppression of the formation of irregularities or pitting at the record marked portion may be observed.

Examples of suitable inorganic materials for the construction of the dielectric layer include nitrides such as AlN, $Si_3N_4$, GeN, TiN, ZrN, InN and BN, oxides such as ZnO, SiO, $SiO_2$, $TeO_x$ (x=1~2), $TiO_2$, $In_2O$, $In_2O_3$, $Al_2O_3$, MnO, GeO and PbO, sulfides such as ZnS, $In_2S_3$ and NiS, fluorides such as $MgF_2$ and $CaF_2$, carbides such as SiC, TaC, TiC, and elemental Carbon C. These inorganic substances can be used alone or in mixtures of two or more substances thereof. There are no particular restrictions relating to the thickness of the dielectric layer although values in the range 5~200 nm are preferable. For layers of less than 5 nm thickness, formation of a uniform layer is difficult. Furthermore, with layers of greater than 200 nm thickness the formation of irregularities at the record marked portions is inhibited. The dielectric layer can be formed by vapor phase growth methods such as sputtering, vacuum deposition, plasma CVD, photo CVD and electron beam deposition.

A light reflection layer is either provided on top of the aforementioned dielectric layer, or on top of the second recording layer 4 in those instances where no dielectric layer is used. There are no particular restrictions relating to the material used for constructing the light reflection layer, although usually metals with high reflectances such as Al, Au, Ag, Pt or Cu, or alloys comprising one or more of these metals, or alternatively semiconductors with high reflectances such as Si, SiN or SiC are used. There are no particular restrictions relating to the thickness of the light reflection layer although values in the range 10~200 nm are preferable. At thicknesses less than 10 nm the reflectance of the layer is insufficient. Furthermore, for layers exceeding 200 nm thickness the formation of irregularities at the record marked portions is inhibited. The light reflection layer can be formed by vapor phase growth methods such as sputtering, vacuum deposition, plasma CVD, photo CVD and electron beam deposition.

For optical recording media of the present invention, recording and reproduction are carried out be irradiating a light beam through the substrate 2 onto the first recording layer 3 and the second recording layer 4. The heat generated by irradiation of the light beam causes the first recording layer 3 and the second recording layer 4 to mix or react together forming an alloy with a low reflectance while also forming irregularities or pitting on the surface, thus enabling information to be recorded. Various methods can be chosen for the actual recording process, although one suitable method would involve spinning a circular shaped optical recording medium and then concentrating the recording light beam through the substrate 2 and then onto the area of the recording layer above the guide track G. For optical recording media of the present invention it is preferable, in order to maintain compatibility with existing drives, to use group recording of the signal onto the area above the guide track G, but in principle, land recording where the signal is recorded onto the land is also possible. Furthermore, the relative speed of the recording layer relative to the light beam can be determined experimentally according to the wavelength and power of the light beam used.

Figure 5:
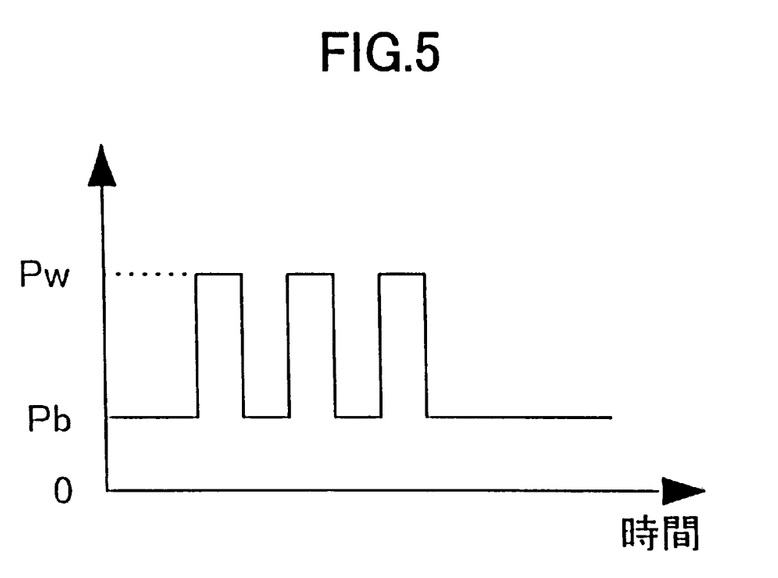
FIG. 5 is a diagram showing a sample pulse strategy for a recording light beam.

The power intensity of the recording light beam and the switching on and off of the beam are controlled in accordance with the signals to be recorded. Furthermore, when a mark length record is recorded by employing a multipulse as shown in FIG. 5, creation of a uniform width for record marks is also possible. Actual values for the recording power Pw and the bottom power Pb of the recording light beam can be determined experimentally in accordance with the wavelength of the light beam used, and the relative speed of the light beam to the recording layer.

On the other hand, the reproduction light beam is a beam of low power which will not produce a recording, and the actual power of this beam can be determined in accordance with the wavelength of the light beam used, and the relative speed of the light beam to the recording layer.

[WORKING EXAMPLES AND COMPARATIVE EXAMPLES]

The present invention is explained in more detail below with reference to working examples and comparative examples.

(Working Example 1)

An optical recording medium 1 was constructed by forming on a transparent polycarbonate substrate 2 (diameter 12 cm, thickness 1.2 mm) incorporating a helical guide track (track pitch 1.6 $\mu$m, track width approximately 0.7 $\mu$m, track depth approximately 30 nm) a first recording layer 3 of 10 nm In using sputtering techniques, and following exposure to the atmosphere then forming a second recording layer 4 of 15 nm Te on top of the first recording layer 3 using sputtering techniques. A UV curing resin layer of approximately 10 $\mu$m was then applied to the top of the second recording layer 4 using spin coat techniques, and this layer then cured by means of exposure to UV radiation, thus forming a protective layer 5 and completing the construction of the optical recording medium 1.

Next, using a CD-R evaluation apparatus, the optical recording medium 1 was spun at such a rate to generate a relative speed between the light spot and the medium of 1.2 m/s, and then using optical pickup of wavelength 781 nm and an objective lens value NA=0.5, the medium was irradiated through the substrate so that the beam focus was on the guide track G, and the intensity of the reflected light then measured.

Moreover, using the same apparatus an EFM signal of standard clock rating 4.32 MHz was recorded, and the amplitude of the 11T signal measured. In this instance, the recording strategy employed follows the "Alternative write strategy" documented in FIG. 2.2 of the CD-R standards (also known as the "Orange Book Part II" Version 2.0), using a recording power set within the range between 4 mW and 13.5 mW so that the $\beta$ value defined in the CD-R standards is 4%. However, in those instances where the $\beta$ value was less than 4% even if the power was set to 13.5 mW, the recording power was set at 13.5 mW. The reproduction power was set at 0.6 mW. The reflectance was obtained by calibration against the intensity of reflected light observed when the position at a specified radius of a standard Philips Corporation CD (5B2) was read using the same apparatus with a reproduction power of 0.6 mW.

(Working Examples 2~7)

Optical recording media were constructed in the same manner as that described for the working example 1 with variations made in the thickness of, and material used in the first and second recording layers 3,4, and the media were then subjected to the same measurements as those described for the working example 1.

(Comparative Example 1)

An optical recording medium was constructed in the same manner as the working example 3, with the exception that the second recording layer 4 was removed and only a single recording layer of Sn50Pb50 alloy of thickness 14 nm was provided, and the medium was then subjected to the same measurements as those described for the working example 1.

(Comparative Examples 2~5)

Optical recording media were constructed in the same manner as that described for the comparative example 1 with variations made in the thickness of, and material used in the first recording layer 3, and the media were then subjected to the same measurements as those described for the working example 1.

For each of the working examples 1~7 and each of the comparative examples 1~5, the thickness of, and materials (compositions) used in the construction of the various recording layers, the reflectance value measured at the guide track portion of the medium prior to recording (the pre-recording reflectance), the recording power, and the degree of modulation of the 11T signal (l11/ltop) are presented in Table 1. Composition values are shown as atom % and were measured using a scanning electron microscope (Arionics ESA3000) and a Philips Corporation energy dispersion X-ray analysis apparatus (EDAX). Moreover, the l11/ltop values are calculated as the maximum amplitude of the reproduction signal voltage divided by the maximum reproduction signal voltage.

TABLE 1

| | First recording layer | Second recording layer | Protective Layer (Y/N) | Pre-recording reflectance (%) | Recording Power (nm) | l11/ltop |
|---|---|---|---|---|---|---|
| Working example 1 | In 10 nm | Te 15 nm | Y | 55.1 | 12.0 | 0.69 |
| Working example 2 | In 15 nm | Ge 20 nm | Y | 61.8 | 10.5 | 0.77 |
| Working example 3 | Sn50Pb50 14 nm | Te89Ge1 1 20 nm | Y | 36.3 | 9.7 | 0.81 |
| Working example 4 | Sn50Pb50 18 nm | Te89Ge1 1 20 nm | Y | 39.8 | 9.0 | 0.81 |
| Working example 5 | Sn50Pb50 22 nm | Te89Ge1 1 20 nm | Y | 44.6 | 9.8 | 0.80 |
| Working example 6 | Sn50Pb50 26 nm | Te89Ge1 1 20 nm | Y | 46.9 | 10.3 | 0.81 |
| Working example 7 | Sn75Ag25 18 nm | Te89Ge1 1 20 nm | Y | 34.5 | 11.0 | 0.82 |
| Comparative example 1 | Sn50Pb50 14 nm | none | Y | 24.8 | 9.0 | 0.52 |
| Comparative example 2 | Sn50Pb50 18 nm | none | Y | 29.8 | 9.0 | 0.57 |
| Comparative example 3 | Sn50Pb50 22 nm | none | Y | 35.3 | 10.0 | 0.61 |
| Comparative example 4 | Sn50Pb50 26 nm | none | Y | 40.0 | 11.0 | 0.65 |
| Comparative example 5 | Sn75Ag25 18 nm | none | Y | 17.3 | 6.4 | 0.47 |

The optical recording media of the working examples 1~7 which comprise a first recording layer 3 incorporating a metal with a low melting point and a high reflectance as a main constituent, and a second recording layer 4 which mixes or reacts with the first recording layer 3 to form an alloy of low reflectance while at the same time forming irregularities or pitting in the recording layer surface, have sufficiently high pre-recording reflectances and large degree of modulation values (l11/ltop) making them excellent optical recording media. The alloy formation and formation of irregularities (or pitting) at the recorded portions were observed using the method described below. Following recording of the signal onto the optical recording medium at optimum recording power, the protective layer 5 comprising UV curing resin was peeled off using adhesive tape thus exposing the second recording layer 4, and the surface at the recorded portions was then observed directly using a scanning electron microscope (SEM), an atomic force microscope (AFM) and Augur electron spectroscopy techniques. Observation by SEM and AFM confirmed the formation of indentations of depths equal to or greater than 10 nm at the recorded portions. Furthermore, atomic analysis of the outermost surface of the recorded portions using Augur electron spectroscopy techniques revealed that at the recorded portions of the optical recording medium of working example 1 the In of the first recording layer 3 and the Te of the second recording layer 4 were detected simultaneously, thus confirming the formation of an InTe alloy. Moreover, at the recorded portions of the optical recording media of working examples 3~6 the Sn and Pb of the first recording layer 3 and the Te and Ge of the second recording layer 4 were detected simultaneously, confirming the formation of a SnPbTeGe alloy.

On the other hand, for the comparative examples 1~5 no second recording layer exists, and so both the pre-recording reflectances and the degree of modulation were lower than those observed for the working examples 3~7, which incorporate the same first recording layer.

(Working Examples 8~23 and Comparative Examples 6~10)

Using transparent polycarbonate substrates 2 (diameter 12 cm, thickness 1.2 mm, track pitch 1.6 µm) incorporating a helical guide track (track width approximately 0.5 µm, track depth approximately 60 nm) a series of optical recording media were constructed in the same manner as the working example 1, with the exception that variations were made in the thickness of, and material used in the first and second recording layers 3, 4, and the media were then subjected to the same measurements as those described for the working example 1.

(Comparative Example 11)

An optical recording medium was constructed in the same manner as the working example 8, with the exception that the second recording layer was removed and only a single recording layer of In of thickness 20 nm was provided, and the medium was then subjected to the same measurements as those described for the working example 1.

(Comparative Example 12)

An optical recording medium was constructed in the same manner as the comparative example 11, with the exception that the protective layer of UV curing resin was not provided thus exposing the In recording layer, and the medium was then subjected to the same measurements as those described for the working example 1.

(Comparative Example 13)

An optical recording medium was constructed in the same manner as the working example 8, with the exception that the first recording layer was removed and only a single recording layer of Te of thickness 20 nm was provided, and the medium was then subjected to the same measurements as those described for the working example 1.

(Comparative Example 14)

An optical recording medium was constructed in the same manner as the comparative example 13, with the exception that the protective layer of UV curing resin was not provided thus exposing the Te recording layer, and the medium was then subjected to the same measurements as those described for the working example 1.

For each of the working examples and comparative examples described above the thickness of, and materials (compositions) used in the construction of the various recording layers, the reflectance measured at the guide track portion of the medium prior to recording (the pre-recording reflectance), the recording power, and the degree of modulation of the 11T signal (l11/ltop) are presented in Table 2.

TABLE 2

| | First recording layer | Second recording layer | Protective Layer (Y/N) | Pre-recording reflectance (%) | Recording Power (nm) | l11/ltop |
|---|---|---|---|---|---|---|
| Working example 8 | In 20 nm | Te 20 nm | Y | 65.3 | 13.5 | 0.78 |
| Working example 9 | In 20 nm | Te 30 nm | Y | 69.3 | 13.5 | 0.71 |
| Working example 10 | In 30 nm | Te 20 nm | Y | 73.5 | 13.5 | 0.77 |
| Working example 11 | In 30 nm | Te 30 nm | Y | 73.5 | 13.5 | 0.79 |
| Working example 12 | In 18 nm | Te 20 nm | Y | 56.2 | 13.5 | 0.87 |
| Working example 13 | In 14 nm | Te 10 nm | Y | 50.7 | 12.0 | 0.82 |
| Working example 14 | In 10 nm | Te 40 nm | Y | 55.4 | 10.3 | 0.78 |
| Working example 15 | In 8 nm | Te 20 nm | Y | 55.0 | 9.5 | 0.71 |
| Working example 16 | In 20 nm | Bi 30 nm | Y | 67.0 | 13.5 | 0.77 |
| Working example 17 | In 20 nm | In13Sb50Te37 20 nm | Y | 66.9 | 13.0 | 0.76 |
| Working example 18 | In93Sn7 18 nm | In13Sb50Te37 20 nm | Y | 53.8 | 11.8 | 0.84 |
| Working example 19 | In95Ag5 18 nm | In13Sb50Te37 20 nm | Y | 51.6 | 11.9 | 0.83 |
| Working example 20 | In 14 nm | Ge19Sb35Te46 20 nm | Y | 53.8 | 11.9 | 0.80 |
| Working example 21 | In 14 nm | Bi54(ZnS)27(SiO$_2$)19 20 nm | Y | 54.9 | 12.8 | 0.83 |
| Working example 22 | In 14 nm | Te15(ZnS)58(SiO$_2$)27 20 nm | Y | 56.8 | 12.0 | 0.86 |
| Working example 23 | In 18 nm | TeOx(x ≈ 2) 20 nm | Y | 55.4 | 13.5 | 0.77 |
| Comparative example 6 | In 20 nm | C 20 nm | Y | 63.1 | measurement impossible | |
| Comparative example 7 | In 20 nm | Al 20 nm | Y | 69.4 | measurement impossible | |
| Comparative example 8 | In 20 nm | Sn 20 nm | Y | 67.3 | 13.0 | 0.13 |
| Comparative example 9 | Al 20 nm | In13Sb50Te37 20 nm | Y | 52.0 | measurement impossible | |
| Comparative example 10 | In13Sb50Te37 20 nm | Al 20 nm | Y | 15.3 | 9.0 | 0.53 |
| Comparative example 11 | In 20 nm | none | Y | 56.4 | 13.5 | 0.39 |
| Comparative example 12 | In 20 nm | none | N | 56.7 | 6.0 | 0.75 |

TABLE 2-continued

| | First recording layer | Second recording layer | Protective Layer (Y/N) | Pre-recording reflectance (%) | Recording Power (nm) | l11/ltop |
|---|---|---|---|---|---|---|
| Comparative example 13 | none | Te 20 nm | Y | 39.5 | 13.0 | 0.36 |
| Comparative example 14 | none | Te 20 nm | N | 39.7 | 5.6 | 0.73 |

The optical recording media of working examples 8~23 which comprise a first recording layer 3 of In or an alloy which incorporates In as a main constituent, and a second recording layer 4 which is constructed of a material which incorporates at least one element from either group 5B or group 6B of the periodic table, have high pre-recording reflectances and large degree of modulation (l11/ltop) making them excellent optical recording media.

On the other hand, for the comparative examples 6~8, the second recording layer does not incorporate an element from group 5B or 6B of the periodic table, and so the heat generated from the light beam irradiation does not bring about the mixing or reaction of the second recording layer with the In of the first recording layer to form an alloy of low reflectance, and consequently there is very little or no change in the reflectance between the state prior to recording and that after recording.

The comparative example 9 is an example of a medium comprising a first recording layer of a metal with a high melting point, and recording proved either impossible, or resulted in an almost non-existent variation in the reflectance (the degree of modulation) between the state prior to recording and that after recording.

The comparative example 10 is an example of a medium where the recording layer used as a first recording layer, undergoes a phase change as a result of the heat generated by light irradiation. The first recording layer incorporates In, but because it is not a main constituent the pre-recording reflectance is low. So-called "low to high" recording was then carried out meaning the reflectance following recording was higher than that prior to recording.

The comparative examples 11~14 are examples of media with a single recording layer which either incorporate or don't incorporate a protective layer, and in those examples without a protective layer, a large degree of modulation was achieved, but the incorporation of a protective layer lead to a large decrease in the degree of modulation, and moreover also required an increase in the recording power to enable recording to be completed.

(Working Examples 24~33)

Optical recording media were constructed in the same manner as the working example 8, with the exceptions that the first recording layer was constructed of In to which various additives were added, and that the thicknesses of the first and second recording layers were set to suitable values, and the media were then subjected to the same measurements as those described for the working example 1. The thicknesses of, and materials (compositions) used in the construction of the first and second recording layers, and the signal characteristics measured thereof are shown in Table 3.

TABLE 3

| | First recording layer | Second recording layer | Protective Layer (Y/N) | Pre-recording reflectance (%) | Recording Power (nm) | l11/ltop |
|---|---|---|---|---|---|---|
| Working example 24 | In95(ZnS)5 20 nm | Te 30 nm | Y | 59.1 | 10.7 | 0.85 |
| Working example 25 | In92(ZnS)8 8 nm | Te 20 nm | Y | 54.6 | 9.0 | 0.73 |
| Working example 26 | In97(MnS)3 18 nm | Te 20 nm | Y | 50.6 | 10.0 | 0.84 |
| Working example 27 | In89(ZnS)7(SiO$_2$)4 20 nm | Te 30 nm | Y | 47.5 | 8.4 | 0.84 |
| Working example 28 | In95(GeS)5 20 nm | Te 30 nm | Y | 63.5 | 10.6 | 0.80 |
| Working example 29 | In94Au3(ZnS)3 18 nm | Te 20 nm | Y | 54.9 | 10.2 | 0.84 |
| Working example 30 | In88Ge12 18 nm | Te 20 nm | Y | 54.1 | 10.7 | 0.82 |

TABLE 3-continued

| | First recording layer | Second recording layer | Protective Layer (Y/N) | Pre-recording reflectance (%) | Recording Power (nm) | l11/ltop |
|---|---|---|---|---|---|---|
| Working example 31 | In95Si5 18 nm | Te 20 nm | Y | 53.8 | 10.5 | 0.81 |
| Working example 32 | In90Ge7Si3 18 nm | Te 20 nm | Y | 53.9 | 10.5 | 0.80 |
| Working example 33 | In95C5 18 nm | Te 20 nm | Y | 50.2 | 11.0 | 0.79 |

The optical recording media of working examples 24~33, in which varying quantities of metal sulfides, metal oxides, C, Si or Ge have been added to the first recording layer, display slightly lower pre-recording reflectances than the equivalent media of the same thickness shown in Table 2 in which the first recording layer contains only In (working examples 9, 12 and 15), but the recording power is reduced and the recording sensitivity improves markedly. The addition of a metal fluoride to a first recording layer comprising predominantly In results in a similar increase in recording sensitivity.

(Working Examples 34~42)

Optical recording media were constructed in the same manner as the working example 25, with the exception that the second recording layer was constructed of Te to which various additives had been added, and the media were then subjected to the same measurements as those described for the working example 1. The thicknesses of, and materials (compositions) used in the construction of the first and second recording layers, and the signal characteristics measured thereof are shown in Table 4.

TABLE 4

| | First recording layer | Second recording layer | Protective Layer (Y/N) | Pre-recording reflectance (%) | Recording Power (nm) | l11/ltop |
|---|---|---|---|---|---|---|
| Working example 34 | In92(ZnS)8 8 nm | Te92Ge8 20 nm | Y | 47.0 | 8.0 | 0.77 |
| Working example 35 | In92(ZnS)8 8 nm | Te99.7Sb0.3 20 nm | Y | 45.7 | 7.9 | 0.75 |
| Working example 36 | In92(ZnS)8 8 nm | Te96Cu4 20 nm | Y | 50.3 | 8.9 | 0.75 |
| Working example 37 | In92(ZnS)8 8 nm | Te92In8 20 nm | Y | 47.6 | 8.8 | 0.75 |
| Working example 38 | In92(ZnS)8 8 nm | Te96C4 20 nm | Y | 49.8 | 7.8 | 0.76 |
| Working example 39 | In92(ZnS)8 8 nm | Te92Ag8 20 nm | Y | 47.5 | 8.0 | 0.76 |
| Working example 40 | In92(ZnS)8 8 nm | Te97B3 20 nm | Y | 50.4 | 8.1 | 0.76 |
| Working example 41 | In92(ZnS)8 8 nm | Te75Si25 20 nm | Y | 49.0 | 7.9 | 0.75 |
| Working example 42 | In92(ZnS)8 8 nm | Te90(ZnS)10 20 nm | Y | 49.6 | 8.0 | 0.77 |

The optical recording media of working examples 34~42, in which various additives have been added to the second recording layer, display slightly lower pre-recording reflectances than the equivalent medium (working example 25) shown in Table 3 in which the thickness of the first recording layer is the same, but the recording power is further reduced and the recording sensitivity improves.

(Working example 43)

An optical recording medium 1 was constructed by using sputtering techniques to form sequentially on a transparent polycarbonate substrate 2 (diameter 12 cm, thickness 1.2 mm) incorporating a helical guide track (track pitch 1.6 µm, track width approximately 0.7 µm, track depth approximately 30 nm) a bedding layer of $SiN_x$ (x≈1.3) of thickness 20 nm and then a first recording layer 3 of In88Ge12 alloy of thickness 22 nm, and following exposure to the atmosphere then forming a second recording layer 4 of Te89Ge11 alloy of thickness 20 nm on top of the first recording layer 3 using sputtering techniques. A UV curing resin layer of approximately 10 µm was then applied to the top of the second recording layer 4 using spin coat techniques, and this layer then cured by means of exposure to UV radiation, thus forming a protective layer 5 and completing the construction of the optical recording medium 1, which was then subjected to the same measurements as those described for the working example 1.

(Working Examples 44~50, Reference Example 1)

Optical recording media were constructed in the same manner as the working example 43 with the exception that the material used for the bedding layer was varied, and the media were then subjected to the same measurements as those described for the working example 1. The optical recording medium for the reference example 1, which was identical to the working example 43 with the exception that no bedding layer was provided, was also subjected to the same measurements as those described for the working example 1. The thicknesses of, and materials (compositions) used in the construction of the various layers for each working example and the reference example, and the signal characteristics measured thereof are shown in Table 5.

10 μm was then applied to the top of the second recording layer 4 using spin coat techniques, and this layer then cured by means of exposure to UV radiation, thus forming a protective layer 5 and completing the construction of the optical recording medium 1, which was then subjected to the same measurements as those described for the working example 1.

TABLE 5

|  | Bedding layer | First recording layer | Second recording layer | Protective Layer (Y/N) | Pre-recording reflectance (%) | Recording Power (nm) | I11/Itop |
|---|---|---|---|---|---|---|---|
| Working example 43 | $SiN_x$ (x ≈ 1.3) 20 nm | In88Ge12 22 nm | Te89Ge11 20 nm | Y | 52.7 | 13.5 | 0.81 |
| Working example 44 | ZnS 20 nm | In88Ge12 22 nm | Te89Ge11 20 nm | Y | 47.0 | 11.1 | 0.77 |
| Working example 45 | MgF2 20 nm | In88Ge12 22 nm | Te89Ge11 20 nm | Y | 49.3 | 13.5 | 0.74 |
| Working example 46 | $ZnO_x$ (x ≈ 1) 20 nm | In88Ge12 22 nm | Te89Ge11 20 nm | Y | 52.2 | 13.5 | 0.85 |
| Working example 47 | $AlN_x$ (x ≈ 1) 20 nm | In88Ge12 22 nm | Te89Ge11 20 nm | Y | 52.5 | 12.2 | 0.80 |
| Working example 48 | $SiO_x$ (x ≈ 2) 20 nm | In88Ge12 22 nm | Te89Ge11 20 nm | Y | 53.2 | 13.5 | 0.79 |
| Working example 49 | $TeO_x$ (x ≈ 2) 20 nm | In88Ge12 22 nm | Te89Ge11 20 nm | Y | 51.2 | 9.4 | 0.83 |
| Working example 50 | (TeO2)89(GeO2)11 20 nm | In88Ge12 22 nm | Te89Ge11 20 nm | Y | 50.3 | 9.2 | 0.82 |
| Reference example 1 | none | In88Ge12 22 nm | Te89Ge11 20 nm | Y | 57.8 | 10.9 | 0.83 |

Providing a bedding layer between the first recording layer and the polycarbonate substrate offers the advantage that it helps prevent the diffusion of water molecules from the substrate through to the recording layer thus improving the durability of the optical recording medium. Furthermore, as can be seen from Table 5, although each of the working examples 43~48 comprising a bedding layer display a small reduction in pre-recording reflectance and recording sensitivity in comparison with the reference example 1 with no bedding layer, the performance remains excellent. Moreover in working examples 49 and 50 in which the bedding layer incorporates a tellurium oxide the recording sensitivity actually improves in comparison with the reference example 1.

(Working Example 51)

An optical recording medium 1 was constructed by using sputtering techniques to form on a transparent polycarbonate substrate 2 (diameter 12 cm, thickness 1.2 mm) incorporating a helical guide track (track pitch 1.6 μm, track width approximately 0.7 μm, track depth approximately 30 nm) a first recording layer 3 of In88Ge12 alloy of thickness 18 nm, and following exposure to the atmosphere then forming sequentially on top of the first recording layer 3 using sputtering techniques an intermediate layer of $AlN_x$ (x≈1) of thickness 5 nm and a second recording layer 4 of Te of thickness 20 nm. A UV curing resin layer of approximately (Working examples 52~60 and Reference Example 2)

Optical recording media were constructed in the same manner as the working example 51 with the exception that the material used for the intermediate layer was varied, and the media were then subjected to the same measurements as those described for the working example 1. The optical recording medium for the reference example 2, which was identical to the working example 51 with the exception that no intermediate layer was provided, was also subjected to the same measurements as those described for the working example 1. The thicknesses of, and materials (compositions) used in the construction of the various layers for the working examples 51~60 and the reference example 2 and the signal characteristics measured thereof are shown in Table 6.

(Working example 61)

An optical recording medium 1 was constructed by using sputtering techniques to form a first recording layer 3 of In of thickness 10 nm on a polycarbonate substrate identical to that of the working example 51, and following exposure to the atmosphere then forming sequentially an intermediate layer by dissolving approximately 0.9 g of cyanine color in 3 cc of 2,2,3,3-tetrafluoro propanol and using a spin coater to apply the material to the top of the first recording layer 3, and a second recording layer 4 of Te of thickness 15 nm using sputtering techniques. A UV curing resin layer of approximately 10 μm was then applied to the top of the second recording layer 4 using spin coat techniques, and this layer then cured by means of exposure to UV radiation, thus forming a protective layer 5 and completing the construction of the optical recording medium 1, which was then subjected to the same measurements as those described for the working example 1.

(Working Example 62)

An optical recording medium 1 was constructed in the same manner as the working example 61 with the exception that the intermediate layer was constructed by spin coating a 1% water solution of N-(2-aminoethyl)-3-aminopropyl trimethoxy silane (amino silane) onto the first recording layer 3 and then lightly washing the surface with water, and the medium was then subjected to the same measurements as those described for the working example 1.

(Working Example 63)

An optical recording medium 1 was constructed in the same manner as the working example 62 with the exception that the intermediate layer was formed from a solution of 0.1 g of stearic acid in 10 cc of hexane, and the medium was then subjected to the same measurements as those described for the working example 1.

(Working Example 64)

An optical recording medium 1 was constructed in the same manner as the working example 62 with the exception that the intermediate layer was formed from a solution of 0.1 g of hexadecanol in 10 cc of hexane, and the medium was then subjected to the same measurements as those described for the working example 1.

(Working Example 65)

An optical recording medium 1 was constructed in the same manner as the working example 62 with the exception that the intermediate layer was formed from a solution of 0.1 g of palmitic acid in 10 cc of hexane, and the medium was then subjected to the same measurements as those described for the working example 1.

The signal characteristics measured for the working examples 61~65 are shown in Table 6.

TABLE 6

| | First recording layer | Intermediate Layer | Second recording layer | Protective Layer (Y/N) | Pre-recording reflectance (%) | Recording Power (nm) | l11/ltop |
|---|---|---|---|---|---|---|---|
| Working example 51 | In88Ge12 18 nm | $AlN_x$ ($x \approx 1$) 5 nm | Te 20 nm | Y | 61.5 | 13.0 | 0.81 |
| Working example 52 | In88Ge12 18 nm | $SiO_x$ ($x \approx 2$) 5 nm | Te 20 nm | Y | 56.2 | 13.3 | 0.83 |
| Working example 53 | In88Ge12 18 nm | $MgF_2$ 5 nm | Te 20 nm | Y | 32.0 | 12.0 | 0.81 |
| Working example 54 | In88Ge12 18 nm | $(In2O3)91(SnO_2)9$ 5 nm | Te 20 nm | Y | 59.1 | 13.5 | 0.82 |
| Working example 55 | In88Ge12 18 nm | SiC 5 nm | Te 20 nm | Y | 60.7 | 13.3 | 0.83 |
| Working example 56 | In88Ge12 18 nm | ZnO 5 nm | Te 20 nm | Y | 59.5 | 13.5 | 0.83 |
| Working example 57 | In88Ge12 18 nm | C 5 nm | Te 20 nm | Y | 59.4 | 13.5 | 0.85 |
| Working example 58 | In88Ge12 18 nm | $TaN_x$ ($x \approx 1$) 5 nm | Te 20 nm | Y | 59.3 | 13.5 | 0.74 |
| Working example 59 | In88Ge12 18 nm | $AlSiN_x$ ($x = 1 \approx 2$) 5 nm | Te 20 nm | Y | 58.6 | 13.5 | 0.84 |
| Working example 60 | In88Ge12 18 nm | $TiN_x$ ($x \approx 1$) 5 nm | Te 20 nm | Y | 60.3 | 13.5 | 0.78 |
| Working example 61 | In 10 nm | cyanine color | Te 15 nm | Y | 40.8 | 8.0 | 0.73 |
| Working example 62 | In 10 nm | amino silane | Te 15 nm | Y | 52.8 | 11.0 | 0.71 |
| Working example 63 | In 10 nm | stearic acid | Te 15 nm | Y | 51.7 | 10.8 | 0.77 |
| Working example 64 | In 10 nm | hexadecanol | Te 15 nm | Y | 53.8 | 12.0 | 0.72 |

TABLE 6-continued

| | First recording layer | Intermediate Layer | Second recording layer | Protective Layer (Y/N) | Pre-recording reflectance (%) | Recording Power (nm) | I11/ Itop |
|---|---|---|---|---|---|---|---|
| Working example 65 | In 10 nm | palmitic acid | Te 15 nm | Y | 52.2 | 10.7 | 0.77 |
| Reference example 2 | In88Ge12 18 nm | none | Te 20 nm | Y | 59.6 | 10.0 | 0.83 |

Providing an intermediate layer between the first and second recording layers offers the advantage that it helps prevent the diffusion and/or mixing of the first and second recording layers during storage thus improving the durability of the optical recording medium. Furthermore, as can be seen from Table 6, although each of the working examples 51~60 comprising an inorganic intermediate layer display a small reduction in recording sensitivity in comparison with the reference example 2 which has the same recording layers but no intermediate layer, the performance remains excellent. Moreover in working examples 61~65 which comprise an organic intermediate layer the signal characteristics reveal performance approximately the same as the working example 1 from Table 1 which comprises the same recording layers of the same thickness but lacks an intermediate layer.

(Working Example 66)

An optical recording medium 1 was constructed by using sputtering techniques to form on a transparent polycarbonate substrate 2 (diameter 12 cm, thickness 1.2 mm) incorporating a helical guide track (track pitch 1.6 μm, track width approximately 0.7 μm, track depth approximately 30 nm) a first recording layer 3 of In of thickness 20 nm, and following exposure to the atmosphere then forming sequentially on top of the first recording layer 3 using sputtering techniques a second recording layer 4 of Te of thickness 10 nm and a dielectric layer of $SiN_x$ (x≈1.3) of thickness 100 nm. A UV curing resin layer of approximately 10 μm was then applied to the top of the dielectric layer using spin coat techniques, and this layer then cured by means of exposure to UV radiation, thus forming a protective layer 5 and completing the construction of the optical recording medium 1, which was then subjected to the same measurements as those described for the working example 1.

(Working Example 67)

An optical recording medium 1 was constructed in the same manner as the working example 66 with the exceptions that In layer of thickness 15 nm was used for the first recording layer and Bi layer of thickness 20 nm for the second recording layer, and the medium was then subjected to the same measurements as those described for the working example 1.

(Working Example 68)

An optical recording medium 1 was constructed in the same manner as the working example 66 with the exceptions that In layer of thickness 10 nm was used for the first recording layer, and a reflective layer of Al having a thickness of 40 nm was formed by sputtering in place of the dielectric layer of $SiN_x$ (x≈1.3), and the medium was then subjected to the same measurements as those described for the working example 1.

(Working Example 69)

An optical recording medium 1 was constructed in the same manner as the working example 68 with the exception that Bi layer of thickness 10 nm was used for the second recording layer, and the medium was then subjected to the same measurements as those described for the working example 1.

(Working Example 70)

An optical recording medium 1 was constructed in the same manner as the working example 68 with the exception that a dielectric layer of $SiN_x$ (x≈1.3) of thickness 160 nm was provided between the second recording layer and the reflective layer, and the medium was then subjected to the same measurements as those described for the working example 1.

(Working Example 71)

An optical recording medium 1 was constructed in the same manner as the working example 70 with the exception that Bi layer of thickness 10 nm was used for the second recording layer, and the medium was then subjected to the same measurements as those described for the working example 1.

For each of the above working examples the reflectance measured at the guide track portion prior to recording (Pre-recording reflectance), the recording power and the degree of modulation of the 11T signal (l11/ltop) are shown in Table 7.

TABLE 7

| | First recording layer | Second recording layer | Dielectric layer | Reflective layer | Protective layer (Y/N) | Pre-recording reflectance (%) | Recording Power (nm) | I11/Itop |
|---|---|---|---|---|---|---|---|---|
| Working example 66 | In 20 nm | Te 10 nm | SiNx (x ≈ 1.3) 100 nm | none | Y | 66.5 | 12.6 | 0.68 |
| Working example 67 | In 15 nm | Bi 20 nm | SiNx (x ≈ 1.3) 100 nm | none | Y | 67.5 | 10.6 | 0.78 |

TABLE 7-continued

|  | First recording layer | Second recording layer | Dielectric layer | Reflective layer | Protective layer (Y/N) | Pre-recording reflectance (%) | Recording Power (nm) | I11/Itop |
|---|---|---|---|---|---|---|---|---|
| Working example 68 | In 10 nm | Te 10 nm | none | Al 40 nm | Y | 67.5 | 11.0 | 0.69 |
| Working example 69 | In 10 nm | Bi 10 nm | none | Al 40 nm | Y | 68.1 | 9.8 | 0.65 |
| Working example 70 | In 10 nm | Te 10 nm | SiNx (x ≈ 1.3) 160 nm | Al 40 nm | Y | 68.8 | 10.6 | 0.62 |
| Working example 71 | In 10 nm | Bi 10 nm | SiNx (x ≈ 1.3) 160 nm | Al 40 nm | Y | 69.2 | 9.7 | 0.67 |

The degree of modulation was slightly lower than that of the working example 1, but the pre-recording reflectance was superior.

(Working Example 72)

An optical recording medium 1 was constructed by using sputtering techniques to form sequentially on a transparent polycarbonate substrate 2 (diameter 12 cm, thickness 1.2 mm) incorporating a helical guide track (track pitch 1.6 μm, track width approximately 0.7 μm, track depth approximately 30 nm) a bedding layer of $SiN_x$ ($x \approx 1.3$) of thickness 40 nm and a first recording layer 3 of In92(ZnS)8 alloy of thickness 14 nm, and following exposure to the atmosphere then forming sequentially on top of the first recording layer 3 using sputtering techniques an intermediate layer of $SiN_x$ ($x \approx 1.3$) of thickness 10 nm, a second recording layer 4 of Te of thickness 20 nm and a dielectric layer of $SiN_x$ ($x \approx 1.3$) of thickness 40 nm. A UV curing resin layer of approximately 10 μm was then applied to the top of the dielectric layer using spin coat techniques, and this layer then cured by means of exposure to UV radiation, thus forming a protective layer 5 and completing the construction of the optical recording medium 1, which was then subjected to the same measurements as those described for the working example 1. The measurements recorded thereof are shown in Table 8.

The measurements show that layer constructions of this type are also feasible.

(Working Example 73)

A CD-R optical recording medium was constructed in the same manner as the working example 12, with the exception that used was a transparent polycarbonate substrate 2 (diameter 12 cm, thickness 1.2 mm) with a helical guide track of track depth d=35 nm, track width w=635 nm and track pitch p=1.6 μm, and on which the address information necessary for CD-R was pre-recorded as snaking (wobble) in the guide track. The real portion of the refractive index of the polycarbonate substrate was n=1.55.

Next, using an optical disk evaluation device DDU-1000 (PulseTech Industries, laser wavelength 781 nm, NA=0.50) the reflectance Rg at the guide track portion (groove) prior to recording, the radial contrast Rcb, the push pull signal PP following recording and the degree of modulation of the 11T signal (l11/ltop) were evaluated. The results thereof are shown in Table 9. In the table a O mark indicates successfully satisfying the CD-R standards and a x mark indicates a failure to satisfy the CD-R standards.

(Working Examples 74~77 and Comparative Examples 15~19)

Optical recording media were constructed in the same manner as the working example 73 with the exception that the depth d and width w of the guide track formed on the surface of the polycarbonate substrate was varied as shown in Table 9, and the media were then evaluated in the same

TABLE 8

|  | Bedding Layer | First recording layer | Intermediate layer | Second recording layer | Dielectric layer | Protective layer (Y/N) | Pre-recording reflectance (%) | Recording Power (nm) | I11/Itop |
|---|---|---|---|---|---|---|---|---|---|
| Working example 72 | SiNx 40 nm | In92 (ZnS)8 14 nm | SiNx 10 nm | Te 20 nm | SiNx 40 nm | Y | 44.7 | 13.5 | 0.64 |

For the bedding layer, the intermediate layer and the dielectric layer x≈1.3 manner as the working example 73. The results thereof are shown in Table 9.

TABLE 9

| | Guide track depth d(nm) | Guide track width w(nm) | Recording Layers First recording layer | Recording Layers Second recording layer | Signal Rg | Signal Rcb | Signal PP | Characteristics I11/Itop |
|---|---|---|---|---|---|---|---|---|
| Working example 73 | 35 | 635 | In 18 nm | Te 20 nm | ○ | ○ | ○ | 0.78 |
| Working example 74 | 20 | 700 | In 18 nm | Te 20 nm | ○ | ○ | ○ | 0.82 |
| Working example 75 | 30 | 400 | In 18 nm | Te 20 nm | ○ | ○ | ○ | 0.72 |
| Working example 76 | 30 | 600 | In 18 nm | Te 20 nm | ○ | ○ | ○ | 0.77 |
| Working example 77 | 50 | 400 | In 18 nm | Te 20 nm | ○ | ○ | ○ | 0.71 |
| Comparative example 15 | 10 | 500 | In 18 nm | Te 20 nm | ○ | x | x | tracking impossible: no measurement |
| Comparative example 16 | 30 | 100 | In 18 nm | Te 20 nm | ○ | ○ | x | tracking impossible: no measurement |
| Comparative example 17 | 30 | 900 | In 18 nm | Te 20 nm | ○ | x | ○ | 0.83 |
| Comparative example 18 | 60 | 500 | In 18 nm | Te 20 nm | x | ○ | ○ | 0.87 |
| Comparative example 19 | 140 | 500 | In 18 nm | Te 20 nm | x | ○ | x | tracking impossible: no measurement |

Light source wavelength: 781 nm

As can be seen clearly from the results in Table 9, for a light beam of wavelength 781 nm: the optical recording media of the working examples 73~77, in which the guide track depth is within the range 15 nm<d<55 nm and the width within the range 160 nm<w<800 nm, in comparison with the optical recording media of the comparative examples 15~19 in which the depth d and width w of the guide track G are outside the aforementioned ranges, satisfy the CD-R standards for reflectance prior to recording (pre-recording reflectance) Rg, radial contrast Rcb, push pull signal following recording PP, and degree of modulation of the 11T signal (I11/Itop), and combine high reflectance with a high degree of modulation. Thus the depth d and width w of the guide track G should preferably be kept within the above ranges in order to satisfy current CD-R standards.

(Working Example 78)

A DVD-R optical recording medium was constructed by using sputtering techniques to form on a transparent polycarbonate substrate 2 (diameter 12 cm, thickness 0.6 mm) with a helical guide track of track depth d=30 nm, track width w=250 nm and track pitch p=0.8 $\mu$m, and on which the address information necessary for DVD-R was pre-recorded as snaking (wobble) and pitting of the guide track, a first recording layer of In93Ge7 alloy of thickness 14 nm, and following exposure to the atmosphere then forming a second recording layer 4 of Te of thickness 16 nm using sputtering techniques on top of the first recording layer 3. A UV curing resin layer of approximately 10 $\mu$m was then applied to the top of the second recording layer 4 using spin coat techniques, and this layer then cured by means of exposure to UV radiation, thus forming a protective layer 5, and a transparent polycarbonate substrate (diameter 12 cm, thickness 0.6 mm) with no guide track was then bonded on top of the protective layer using an adhesive layer, thus completing the construction of the DVD-R optical recording medium. The real portion of the refractive index of the polycarbonate substrate was n=1.55.

Next, using an optical disk evaluation device DDU-1000 (PulseTech Industries, laser wavelength 635 nm, NA=0.60) the reflectance Rg at the guide track portion (groove) prior to recording, the radial contrast Rcb, the push pull signal PP following recording and the degree of modulation of the 14T signal (I14/Itop) were evaluated. With a relative speed between the light spot and the medium of 3.84 m/s, an EFM signal of standard clock rate 26.16 MHz was recorded. The recording power was set to a suitable value within the range 6 mW~12 mW and the reproduction power to 0.6 mW. The results thus obtained are shown in Table 10. In the Table a O mark indicates successfully satisfying the DVD-R standards and a x mark indicates a failure to satisfy the DVD-R standards.

(Working Examples 79, 80 and Comparative Examples 20~22)

Optical recording media were constructed in the same manner as the working example 78 with the exception that the depth d and width w of the guide track formed on the surface of the polycarbonate substrate was varied as shown in Table 10, and the media were then evaluated in the same manner as the working example 78. The results thereof are shown in Table 10.

TABLE 10

|  | Guide track | | Recording Layers | | Signal | | | Characteristics |
|---|---|---|---|---|---|---|---|---|
|  | depth d(nm) | width w(nm) | First recording layer | Second recording layer | Rg | Rcb | PP | I11/Itop |
| Working example 78 | 30 | 250 | In93Ge7 14 nm | Te 16 nm | ○ | ○ | ○ | 0.72 |
| Working example 79 | 40 | 200 | In93Ge7 14 nm | Te 16 nm | ○ | ○ | ○ | 0.70 |
| Working example 80 | 35 | 150 | In93Ge7 14 nm | Te 16 nm | ○ | ○ | ○ | 0.66 |
| Comparative example 20 | 55 | 250 | In93Ge7 14 nm | Te 16 nm | x | ○ | x | tracking impossible: no measurement |
| Comparative example 21 | 30 | 450 | In93Ge7 14 nm | Te 16 nm | ○ | x | ○ | 0.73 |
| Comparative example 22 | 10 | 200 | In93Ge7 14 nm | Te 16 nm | ○ | x | x | tracking impossible: no measurement |

Light source wavelength: 635 nm

As can be seen clearly from the results in Table 10, for a light beam of wavelength 635 nm, the optical recording media of the working examples 78~80, in which the guide track depth is within the range 12.3 nm<d<45.1 nm and the width within the range 80 nm<w<400 nm, in comparison with the optical recording media of the comparative examples 20~22 in which the depth d and width w of the guide track G are outside the aforementioned ranges, satisfy the DVD-R standards for reflectance prior to recording (pre-recording reflectance) Rg, radial contrast Rcb, push pull signal following recording PP, and degree of modulation of the 14T signal (l14/ltop), and combine high reflectance with a high degree of modulation. Thus the depth d and width w of the guide track G should preferably be kept within the above ranges in order to satisfy current DVD-R standards.

What we claimed are:

1. An optical recording medium comprising;
   a substrate which is substantially transparent with respect to a recording light beam and a reproduction light beam,
   a metallic first recording layer which is layered on top of said substrate and which incorporates In as the main constituent, and
   a metallic or non-metallic second recording layer which is layered on top of said first recording layer and which incorporates at least one element from group 5B or group 6B of the periodic table and which will, due to heat generated from irradiation of a light beam through said substrate, form an alloy with said first recording layer thereby enabling the recording of information.

2. An optical recording medium according to claim 1, having a protective layer which is layered on top of said second recording layer.

3. An optical recording medium according to claim 1, wherein said first recording layer includes at least one of Ge and Si.

4. An optical recording medium according to claim 1, wherein said second recording layer has Te as a main constituent.

5. An optical information recording method for recording optical information onto an optical recording medium which comprises;
   a substrate which is substantially transparent with respect to a recording light beam and a reproduction light beam,
   a first recording layer which is layered on top of said substrate and which incorporates as the main constituent a metal which has a low melting point and a high reflectance, and
   a second recording layer which is layered on top of said first recording layer,
   wherein said first and second recording layers are either mixed, or alternatively reacted due to heat generated from irradiation of a recording light beam through said substrate to form an alloy of low reflectance as well as forming irregularities or pitting in the surface, thereby recording information.

* * * * *